(12) United States Patent
Ehrenberger et al.

(10) Patent No.: US 6,443,489 B1
(45) Date of Patent: Sep. 3, 2002

(54) SIMPLE RETAINING NET WITH RETAINING STRAPS (75) Inventors: Marina Ehrenberger, Esslingen; Mathias Elasässer, Reichenbach; Holger Seel, Aidlingen; Eduard Ament, Aichwald, all of (DE)

(73) Assignee: Baumeister & Ostler GmbH & Co. (DE)

( * ) Notice: Subject to any disclaimer, the term of this patent is extended or adjusted under 35 U.S.C. 154(b) by 0 days.

(21) Appl. No.: 09/762,191

(22) PCT Filed: Jul. 26, 1999

(86) PCT No.: PCT/DE99/02287
§ 371 (c)(1),
(2), (4) Date: Mar. 26, 2001

(87) PCT Pub. No.: WO00/07852
PCT Pub. Date: Feb. 17, 2000

(30) Foreign Application Priority Data

Aug. 4, 1998 (DE) .......................................... 198 35 230

(51) Int. Cl.[7] .............................................. B60R 21/06
(52) U.S. Cl. .................... 280/749; 296/24.1; 296/37.16
(58) Field of Search ................................ 280/748, 749, 280/801.1; 296/24.1, 37.15, 37.16

(56) References Cited

U.S. PATENT DOCUMENTS

| 3,997,189 A | 12/1976 | De Bosredon et al. |
| 5,529,341 A | 6/1996 | Hartigan |
| 5,695,217 A | 12/1997 | Ament et al. |

FOREIGN PATENT DOCUMENTS

| DE | 2529390 A1 | 1/1976 |
| DE | 4441610 A1 | 11/1994 |
| DE | 29712251 U1 | 10/1997 |
| DE | 19730801 C1 | 3/1999 |
| EP | 0642955 A1 | 3/1995 |

Primary Examiner—Paul N. Dickson
Assistant Examiner—Faye M. Fleming
(74) Attorney, Agent, or Firm—Leydig, Voit & Mayer, Ltd.

(57) ABSTRACT

In a retaining net arrangement the lower edge (16) of the retaining net (13) is fixed in the vehicle with two anchoring elements (24). To the anchoring elements (24) there belong two non-extensible tension elements which are held in the suspended state under a corresponding pre-stressing state by pre-stressing elements. An automatically acting clamping device leads both the pre-stressing forces for the tensioning of the retaining net into the car body (7) and also the increased forces which arise when an object is flung against the retaining net (13).

20 Claims, 8 Drawing Sheets

Fig. 8

SIMPLE RETAINING NET WITH RETAINING STRAPS

FIELD OF THE INVENTION

The invention generally relates to cargo retaining nets for use in automobiles.

BACKGROUND OF THE INVENTION

With station wagons having the rear seat in a non-functional position, the baggage space is completely closed off from the passenger space. But even with a raised rear seat back, however, there is present between this and the overhead roof an opening through which, in the event of a collision, objects can be flung out of the baggage space into the passenger space. In order to prevent this, retaining nets are used which are supposed adequately to close off this opening.

Similar situations prevail with so-called compact cars, when the rear seat back is hinged down.

Actually, the latter actually need a retaining net only for the operating state with a hinged-down rear seat back, since with the rear seat back upright sufficient protection is given by the hat deposit area and the rear seat back itself. At least for these applications it is not worthwhile to provide a technically complete housing for the safety net, into which the safety net will be reeled when not in use. These housings, moreover are relatively awkward and difficult to accommodate if, when not in use, they are taken out of the vehicle.

It is well known from DE 197 30 801, therefore, to use a retaining net which does not require a housing and in which the lower edge is anchored in the vehicle with the aid of straps and hooks.

These straps are un-extensible and a corresponding part of each strap is bridged with an elastically extensible band. In this bridging area the un-extensible strap hangs slack in the non-tensioned state as well as in the tensioned state of the retaining net. The pre-stressing for the retaining net is produced by the respective piece of the elastically extensible band.

If in the event of a crash, an object is flung out of the baggage space against the retaining net, then first of all the elastically extensible band yields until the pull force is taken up by the previously bridged section of the non-extensible strap.

This solution is, to be sure, very simple and is also capable of compensating for car-body tolerances or to make possible the hooking of the hooks, but it is affected with a disadvantage. In consequence of the extensible section, the retaining net can bulge relatively strongly into the passenger space before the non-extensible strap is active over its full length.

OBJECTS AND SUMMARY OF THE INVENTION

Accordingly, in view of the foregoing, a general object of the present invention is to provide a retaining net which has a simple design and bulges less strongly and, therefore, responds more rapidly than prior art retaining nets.

In contrast to the state of the art, in which the elastically expansible member lies parallel over the section of the elastically non-expansible tension element, in the present invention the pre-stressing element is arranged functionally in series with the elastically non-expansible tension element. Thereby there is assured a clean holding-taut of the retaining net in the hooked-in state. On the other hand, between the retaining net and the hooking-in arrangement there lies exclusively a taut section of the non-expansible tension element. The retaining net, accordingly can respond immediately, because its lower edge does not at first have to cover a certain part of the trajectory before a complete tensioning of the elastically expansible parts has taken place. With the inventive solution the pre-stressing elements do not lie in the path of forces along which the forces from the retaining net are introduced into the car-body.

The clamping device cooperates with the non-expansible tension element and connects the retaining net with the suspension arrangement that is provided for (the net's suspension in hooks or eyes of the vehicle body).

By reason of the loop-form path of the non-expansible tension element, the clamping arrangement uncouples the pre-stressing element from the force transfer path between the retaining net and car body.

For anchoring of the pre-stressing elements several possibilities come into consideration. At one end, the pre-stressing elements can be connected directly or indirectly with the free end (i.e. the end lying away from the retaining net) of the tension elements, while their other end is fastened to the retaining net itself, in such manner that the pre-stressing element and the tension element form a completely closed loop. This loop is drawn by the pre-stressing elements into the shortened position. With the aid of the clamping device hooked into the loop and that of the anchoring arrangement, the loop in the setting-up of the retaining net is correspondingly drawn out lengthwise and held taut by the pre-stressing elements.

In another embodiment it is possible to connect the other end of the pre-stressing element with the clamping device, so that the pre-stressing element tends to pull back the loop end in the direction toward the adjacent edge of the retaining net.

According to one embodiment the pre-stressing element is formed either by an elastically extensible member or by a pressure member.

An especially secure holding of the retaining net is achieved if the clamping device shows a self-reinforcing or servo effect in such manner that the clamping force with which the tension element is held fast is all the greater as the tension force which is active between the hooking-in device and the retaining net is greater. This servo effect can be achieved by corresponding geometric design of the clamping surfaces.

The clamping arrangement has two clamping elements between which the tension element runs through. One of the two clamping elements is connected with the hooking-in device.

A good servo effect can be achieved when the second clamping element is simultaneously the return device about which the tension element is led around during formation of the loop. The strong encircling of approximately 180° that arises, because of the friction between the clamping element and the tension element, reinforces the holding force applied by the clamping arrangement.

If the pre-stressing elements are supported on the clamping arrangement, buttressing mechanisms can be provided, the spacing of which from the second clamping element is variable. Thereby there can be achieved an especially force-saving hanging of the hooking-in arrangement into the vehicle-side holders.

A constructively simple solution is obtained if the clamping device has a housing into which the tension element is introduced and in which the second clamping element is arranged. In this housing, the hooking-in device is borne in a direction parallel to the longitudinal extent of the tension element.

The second clamping element can be formed by a rod which is rigidly arranged in the housing. Another possibility is to support the rod movably in the housing, transversely to the direction of movement of the hooking-in device, in order to insure locking with the first clamping element.

The rod movably borne in the housing can be provided on its two ends in each case with a radially running arm which carries a continuation or projection which at its free end is running parallel to the rod. The two arms lie in a common plane and are arranged so that their continuations or projections can hook with corresponding back-cuttings on the hooking-in device, in order to introduce the clamping force directly in the direction of the hooking-in arrangement on which the first clamping element is formed.

This first clamping element can be formed by an edge that is part of a punched edge or by a strip that has arisen through a bend-over on the hooking-in device.

These and other features and advantages of the invention will be more readily apparent upon reading the following description of preferred exemplary embodiments of the invention and upon reference to the drawings wherein:

While the invention will be described and disclosed in connection with certain preferred embodiments and procedures, it is not intended to limit the invention to those embodiments. Rather it is intended to cover all such alternative embodiments and modifications as fall within the spirit and scope of the invention.

DETAILED DESCRIPTION OF PREFERRED EMBODIMENTS

Figure 1:
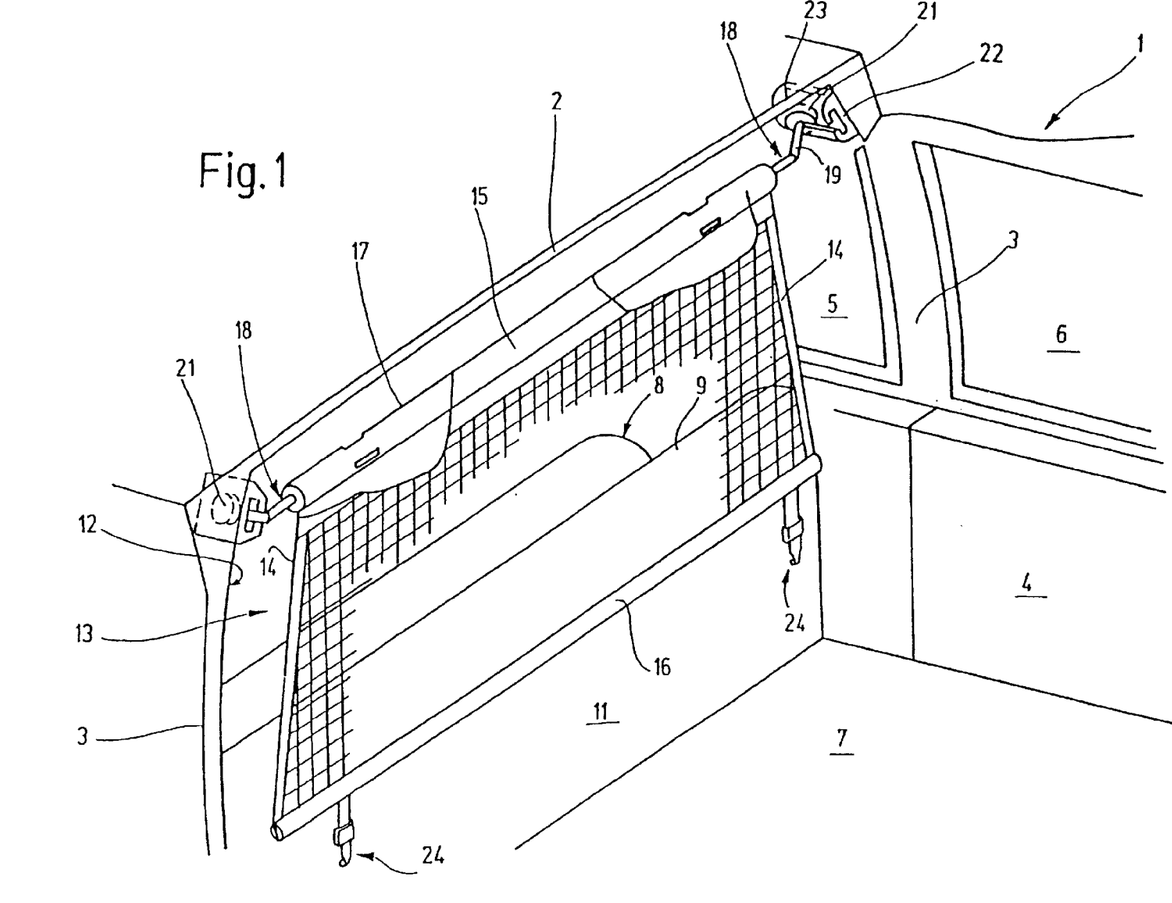
FIG. 1 is a partial rear perspective view of an illustrative motor vehicle showing a retaining net according to the invention clamped between the roof of a motor vehicle and the rear seat back.

FIG. 1 shows, in cut-away representation, a rear area 1 of a station wagon. The rear area 1 is represented in perspective about from the view of the cut-away left side rear window and it has a roof 2, which is borne laterally by two C-columns 3. In front of the C-column 3, a rear-side window 5 lies underneath the roof 2 and above a side wall 4, while behind the C-column 3 there is arranged a farther rear side window 6. The arrangement of the side windows 5 and 6 is to be imagined in mirror image on the left side of the rear area. The rear area 1 is closed off underneath by an essentially flat loading surface.

Between the two rear side windows 5 there is present at the level of the C-columns 3 a rear seat bench 8, the rear seat backrest 9 of which stands about between the two C-columns 3.

Between the under edge of the roof 2 and the upper edge of the rear seat back 9 there is present an opening 12, over which passenger space arranged in front of the rear seat back 9 communicates with the loading space of the rear area 1 located behind the passenger space.

In order, in the event of a crash, to prevent objects from being flung out of the rear area 1 into the passenger space, the opening 12 is closed by a retaining net 13. The retaining net 13 is shown in plan view in FIG. 2.

Figure 2:
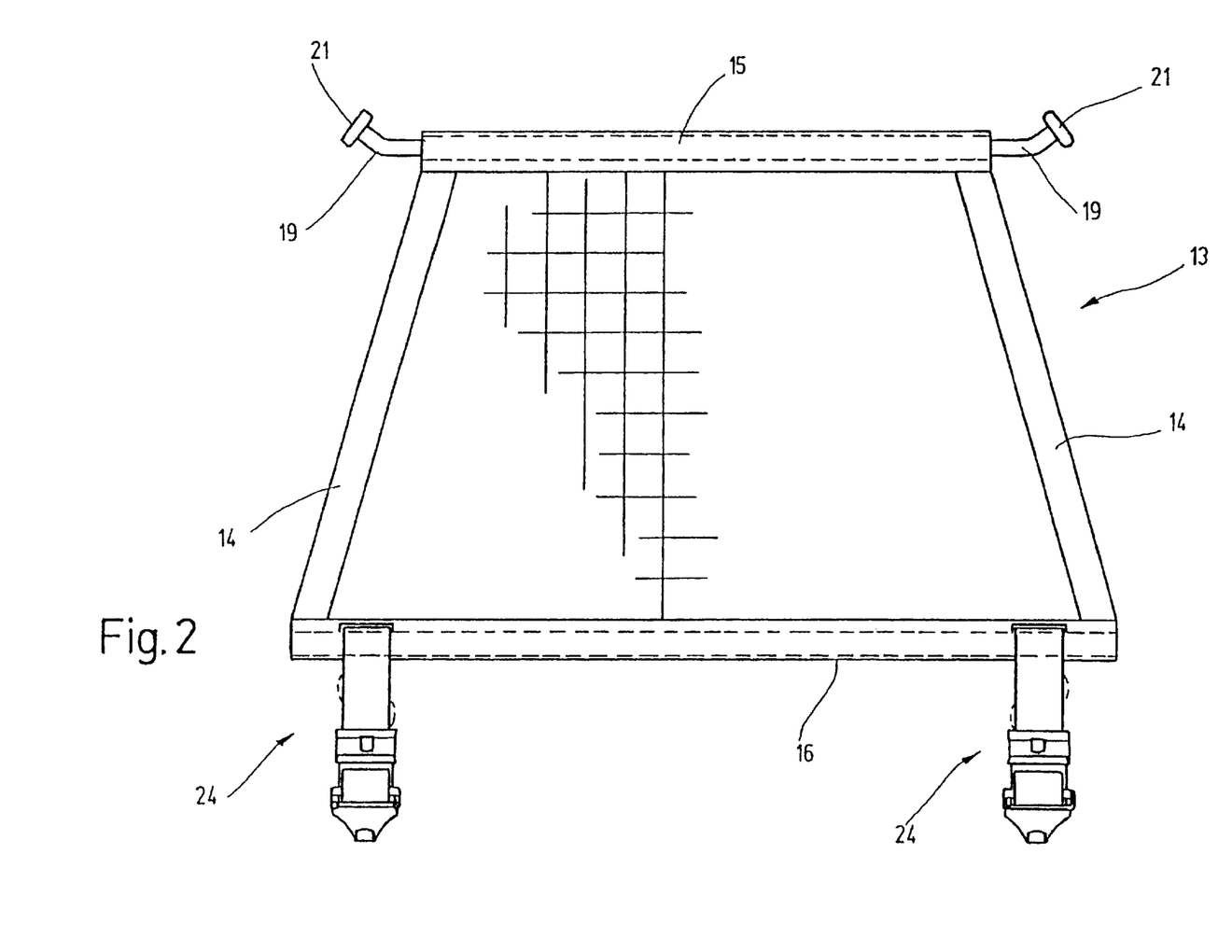
FIG. 2 is an enlarged elevation view of the retaining net of FIG. 1.

The retaining net 13 is trapezoidal and is bounded by two lateral edges 12 possibly enclosed by straps, an upper edge 15 as well as a lower edge 16. The upper edge 15 is executed as a loop, in which there is inserted a pull-rod or strut 17. This strut 17 is tubular and contains energy-consuming elements 18. From the energy-consuming elements 18 there project fastening members 19, which are provided on their ends with mushroom-shaped heads 21. With these mushroom-shaped heads 21 the anchoring members are installed in T-grooves 22 of car body-side receiving elements 23.

The under-edge 16 is likewise constructed as a loop and contains in this loop a rod or strut not further discernible, likewise in the form of a tube.

In the vicinity of the ends there are further provided two additional lower anchoring elements 24, which are hooked into bows or eyes (not further discernible) on the rear side of the rear seat back 9.

The two lower anchoring elements 24 are alike and are explained in the following with the aid of FIGS. 3 to 6, in respect to their construction and their functioning. There the figures show exclusively the formation elements essential to the invention, without going into details relative to separating joints and the like, for example, which are required in connection with the production or assembling.

To the lower anchoring elements 24 there belong an essentially non-extensible belt strap 26 with an upper end 27 as well as a lower end 28, a extensible band 29 with an upper end 31 as well as a lower end 32, a clamping device 33 as well as a hooking-in device 34 or suspension. Finally there further belongs to the anchoring elements 24 a holder 35, which consists of synthetic material.

The holder 35 has two lateral longitudinal struts 36 and 37, spaced from one another and running parallel to each other, which are joined at their upper end by means of two transversely running walls 38 and 39 and at their lower end by a cross-web 40.

Figure 3:
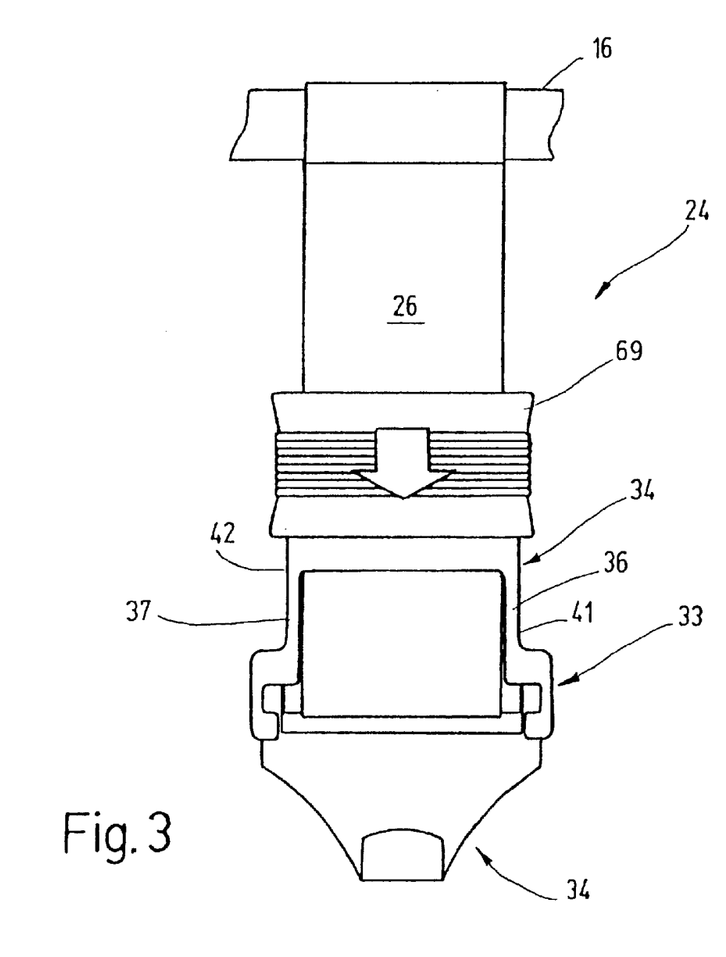
FIG. 3 is an enlarged elevation view of one of the anchoring members.
Figure 4:
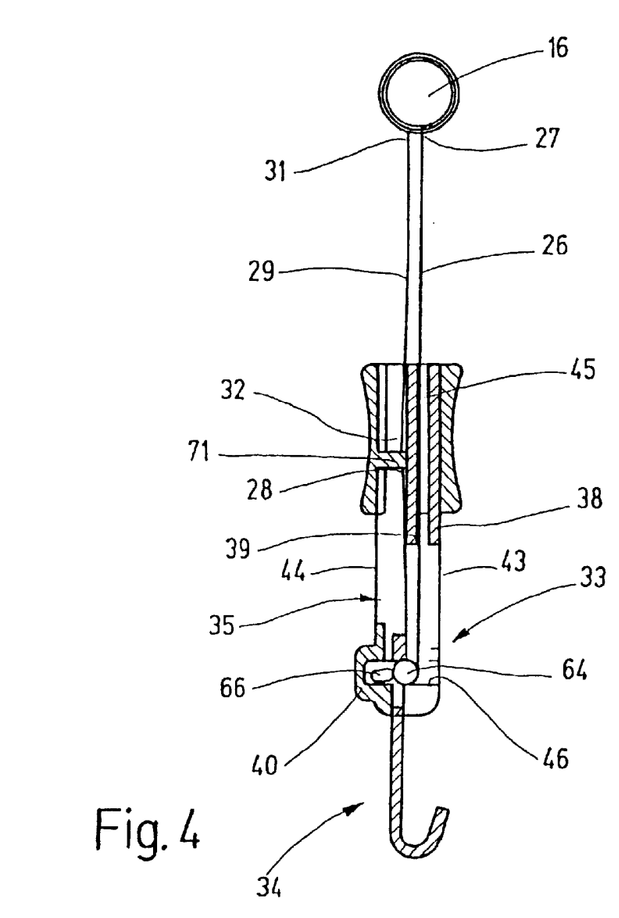
FIG. 4 is a longitudinal section view of the anchoring member of FIG. 3.
Figure 5:
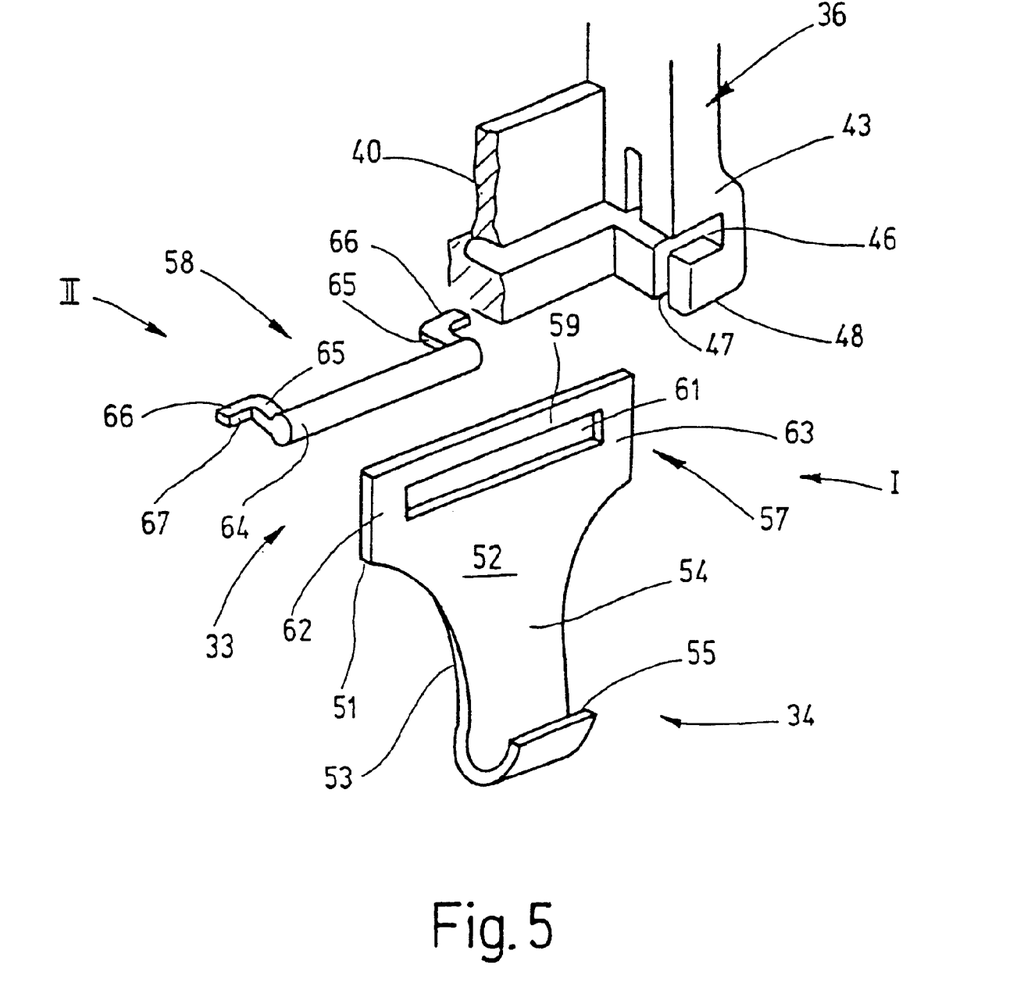
FIG. 5 is a partially cutaway, exploded perspective view of the anchoring member of FIG. 3.

The two longitudinal struts 36 and 37 form, with their outer sides 41 and 42 parallel to each other, narrow sides of the oblong holder 35 and, namely, about to the level of the crossweb web 40. At this point, as FIG. 3 shows, the side walls 41 and 42 project outward.

Furthermore, the two longitudinal struts 36 and 37 have, as seen over the length, a constant thickness measured between their front side 43 and their rear side 44. This condition is obtained likewise to about the height of the cross strut 40. Therewith the holder 35, beginning with its upper end, and on to the cross web 40, has a constant rectangular cross section with respect to its outer dimensions.

The wall 39 runs about to the middle of each lengthwise strut 36, 37 with respect to its thickness measured between the front side 43 and the rear side 44. The front wall 38, however, is flush with the front side 43. In this manner there arises between the two walls 38 and 39 a guide channel 45, through which the belt strap 26 runs. The width of the guide channel, i.e. the distance from one another of the two longitudinal struts 36 and 37, corresponds to the width of the belt band 26 plus a sufficient play. The clear width of the guide channel 45, rectangular in cross section, is likewise attuned to this.

In the area of its lower end the longitudinal strut 36 has a groove 46, rectangular in cross section, proceeding from the front side 43, which opens in the direction toward the oppositely lying longitudinal strut 37. The longitudinal extent of the groove 46 stands perpendicular to the front side 43 and it extends on into the cross-web 40.

A further groove 47 rectangular in cross section begins on an underside 48 of the longitudinal strut 36 and extends parallel to the front side 43 at a distance from the rearward cross-web 40. The two grooves 46 and 47 intersect each other, as the figure makes evident. They serve for the reception and guidance of the clamping device 33, as well as of the hooking-in device 34.

The other longitudinal strut 37 is provided in the area of the cross-web 40 with a mirror-image arrangement of grooves, which correspond to the grooves 46 and 47 and are flush with these.

The hooking-in device 34 consists of a sheet metal cut-out 51 with a front side 52 and a rear side 53. The sheet metal cut-out 51 has an upper, about rectangular section, proceeding from which the sheet metal cutout 51 tapers to a neck part 54, which is bent up on its lower free end into a plate hook 55.

The clamping device 33 for the non-extensible belt band 26 consists of a first clamping element 57 as well as a second clamping element 58. The first clamping element 57 is formed by a straight edge 59 of a rectangular oblong hole 61 which is punched in the upper region of the plate cut-out 51. By reason of the position of the rectangular oblong hole 61, two lateral struts 62 and 63 remain standing. The dimensions of the oblong hole 61 are attuned to the dimensions of the second clamping element 58.

The second clamping element 58 consists of a cylindrical rod 64 which is provided on its face-side ends with two radially protruding arms 65. The arms 65 extend on their free end into two continuations or projections 66, which form a bearing surface 67 running parallel to the longitudinal extent of the rod 64 and facing this.

In the mounted state, the bearing surfaces 67 of the two arms lie on the rear side 53 of the plate cut-out 51, and, namely, in the region of the lateral struts 62 and 63. In this position, the cylindrical rod 64 projects more or less far forward toward the front side 52, and through the rectangular oblong hole 61, as FIG. 6 makes evident.

On the holder 35 there is borne longitudinally slidably a sleeve shaped pusher 69, which carries a strut 71 projecting to the rear side of the wall 39. On this strut 71 the lower end 32 of the elastic band 29 as well as the second end 28 of the essentially non-extensible strap 26 is anchored. The upper ends 27 and 31 of the two bands 26 and 29 are jointed in a suitable manner with the lower edge 16 for the retaining net 13, for example as they are sewed in common to a loop embracing the under-edge 14.

Figure 6:
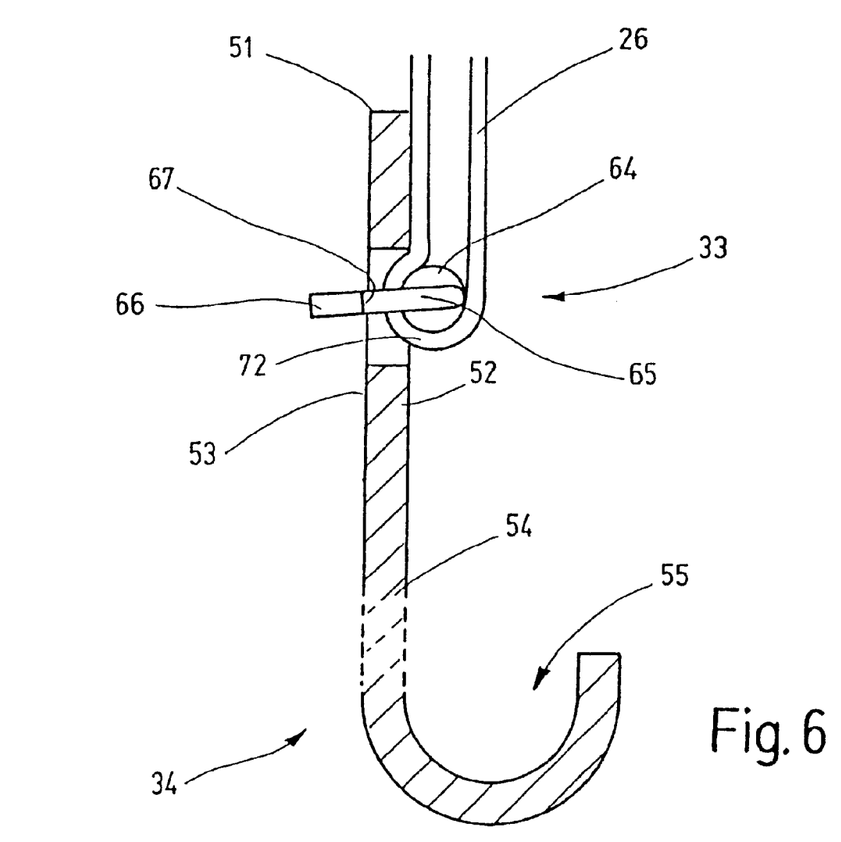
FIG. 6 is an enlarged longitudinal section view of the anchoring member of FIG. 3 showing the course of the belt band.

Proceeding from the lower edge 16 of the retaining net 13, the non-extensible belt strap 26, coming from above, leads through the rectangular channel 45 up to the clamping device 33. In the clamping device 33, the belt strap 26, during the formation of a loop end 72, lies around the second clamping element 48 in the form of a cylindrical rod 64, so that there results a loop with a lower loop end 72 (FIG. 6).

Proceeding from the loop end 72, the non-extensible belt strap 26 leads between the second clamping element 58 and the upper hole edge 59 that is located on the front side 52, from here it extends upward proceeding along the front side 52. The ascending part which, as it were, represents the empty-side rope in the loading case, runs on the back side of the wall 39 and, as already mentioned, is fastened with its free end 28 to the strut 71.

The elastically extensible band 29 likewise begins at the strut 71 and extends upward beside the rear side of the wall 39 to the lower edge 16.

In the mounted state, the plate cutout 51 forming the hook 55 with its two lateral struts 62 and 63, slides in the vertically running grooves 57, while the outer standing arms 66 of the second clamping element 58 find space in the groove 56 and, namely, in the region between the cross-web 40 and the groove 47.

The handling and functioning of the safety net arrangement according to FIG. 1 as well as of the anchoring elements 24 is as follows:

The retaining net 13 is first hooked by its upper anchoring elements 19 into the two T-grooves 22 of the car-body sides. The retaining net 13 now hangs, proceeding from its upper edge 15 with its two anchoring elements 24, slackly downward. The elastically extensible bands 29 of the two anchoring elements 24 are relaxed—i.e. the loop formed by strap 26 and band 29 has its least length, which corresponds to a short distance between the lower loop end 72 and the lower net edge 16. In this state the clevis-type eyelets into which the hooks 55 are to be hung are at a clear distance underneath the hooks 55.

For the hanging-in of the respective hook 55, the user grasps the pusher 69 and moves it downward, which leads to a lengthening of the loop and to a displacement downward of the lower loop end 72 i.e. the non-extensible belt strap 26 slides force-free through the gap between the two clamping elements 57 and 58. The weight of the hook 55, which bears on the interposed layer of the belt strap 26 on the second clamping element 58, is not capable of generating any clamping force which would hamper the sliding-through of the belt strap 26.

As soon as the hook 55 has been moved downward in this manner far enough to be hooked in, the user releases the pusher 69 or moves it upward. Because of the releasing of the pusher 69 the extensible band 29 can become active and it tautens the non-extensible strap 26, as it draws its end 28 upward. There again a part of the strap 26 moves upward through the gap between the edge 59 and the rod 64.

This process is repeated with the other anchoring element 24 with which the retaining net 13 is set up. The elastic force for the retaining net 13 corresponds to the pull force that the two extensible bands 29 develop.

If, in the set-up state, in consequence of a strong braking action or of a collision, an object should be flung out of the cargo space in the direction of the passenger space, then the object strikes against the retaining net 13 and tends to force it into the passenger space. This force leads to an additional pull force in the non-extensible belt strap 26 of each anchoring element 24. This force tends, against the action of the extensible band 29, to draw the non-extensible belt strap 26 through the gap between the two clamping elements 57 and 58.

This force tends to draw the second clamping element 58, encircled upward over somewhat more than 180°, which element, however, is held back by the first clamping element held fast in the car-body.

This pull force tends, furthermore, to draw the second clamping element 58 upward and forward, out of the oblong hole 61. This is prevented, however, by the buttressing surfaces 67 bearing with correspondingly strengthened force on the rear side 53 of the webs 62 and 63.

In this manner there is an increased clamping force with which the non-extensible belt strap is clamped between the two clamping elements 57, 58. A clamping-in force arises there which presents a slipping of the belt strap 26. The greater the force now becomes which acts in the belt band 26, all the greater the force becomes with which the second clamping element 58 is pressed against the edge 59 which represents the first clamping element 57, because the hook 55 is anchored in fixed position in the car-body.

This effect is further favored by the circumstance that the second clamping element 58 is encircled, so that to the clamping force between the first and the second clamping elements 57 and 58 there is added still the adhesive friction with which the belt strap 26 is held fast on the outer circumferential surface of the second clamping element 58.

By suitable choice of the spacing between the buttress surfaces 67 and the rod 64, that is to say of the thickness of the plate cut-out 51, it is possible to vary within wide limits the above-described self-reinforcing property of the clamping arrangement 33. In any case, care must be taken that, with a pulling force in the non-extensible belt strap 26, the clamping force between the two clamping elements 57 and 58 increases, in order to prevent a slipping-through of the non-extensible belt strap 26; they must show a certain servo effect.

With the taking-out of the retaining net arrangement, jamming is neutralized. The user again grasps the pusher 69 and moves it downward. Thereby the belt strap 26 is relaxed in the area between the pusher 69 and the clamping device 33 and also there is a decrease of the pre-stressing force with which the hook 55 is drawn against the peripheral surface of the second clamping element 58. The decreasing of this contact pressure force eliminates the clamping effect and the non-extensible belt strap 26 can freely slide through between the two clamping elements 57 and 58. As soon as the hook 55 has been moved far enough downward in this manner, it comes free from the suspension eyes and the user can release the pusher 69. The extensible band 29 is thereupon shortened again to the rest length and the hook 55 is located above the respective eye.

The embodiment of the anchoring elements according to FIGS. 3 to 6 requires an extensible band that is likewise anchored on the under-edge 16 of the retaining net 13. If this is felt to be unsuitable, then the solution according to FIG. 7 can be used. This embodiment does not differ from the previous embodiment in respect to the construction of the clamping arrangement 33 and of the suspension arrangement 34. Also the non-extensible belt strap 26 shows the same course in the holder, up to the pusher 69. The sole essential distinction lies in that instead of the extensible band 29 there are now used one or more draw springs 75 which at one end engage on the pusher 69 and at the other end on the holder 35 above the pusher 69. To that end, the holder 35 is lengthened over a distance upward, and the one or several springs 75 engage on a strut of the pusher 69 which leads from the side over an oblong hole into the space between the two walls 38 and 39.

Figure 7:
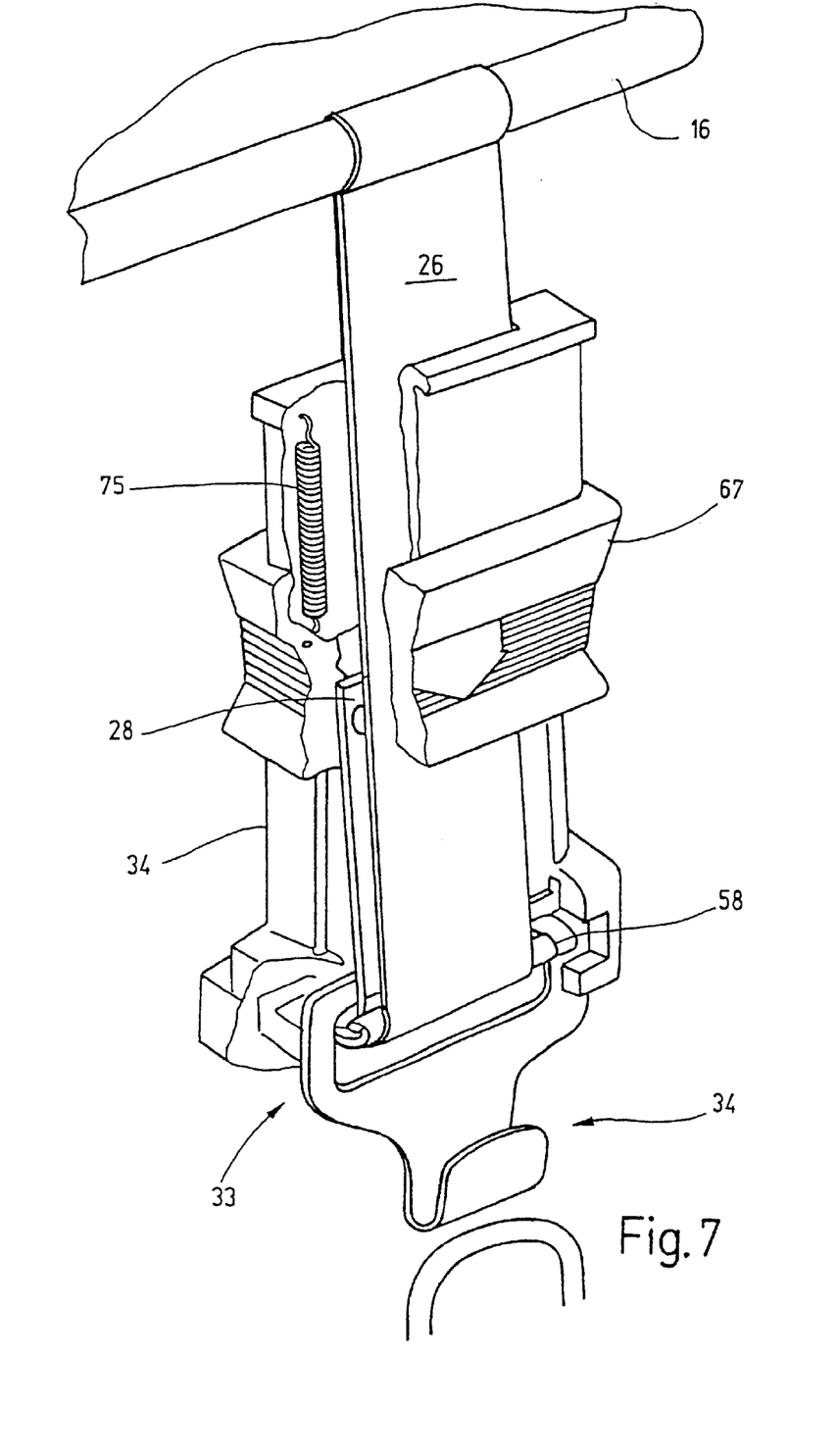
FIG. 7 is a partially broken open perspective view of an alternative embodiment of the anchoring arrangement.

The functioning of the spring 75 is as follows:

The draw spring 75 tends to draw the pusher 69 as far as possible upward. Since the position of the second clamping element 58 is fixed in the lower part of the holder 35, a shortening of the length of the spring 75 leads to the result that the lower loop end 72 is moved upward in the direction toward the lower edge 16 of the retaining net 13. Conversely, the loop end 72 moves downward when the user moves the pusher 69 downward, which is accompanied by a stretching of the draw spring 75.

The clamping action of the clamping arrangement 33 is the same as described earlier, for which reason a renewed explanation is unnecessary.

If a greater stroke is desired, there is also the possibility of using, instead of the draw spring 75, for example a belt winder with a spring motor.

Figure 8:
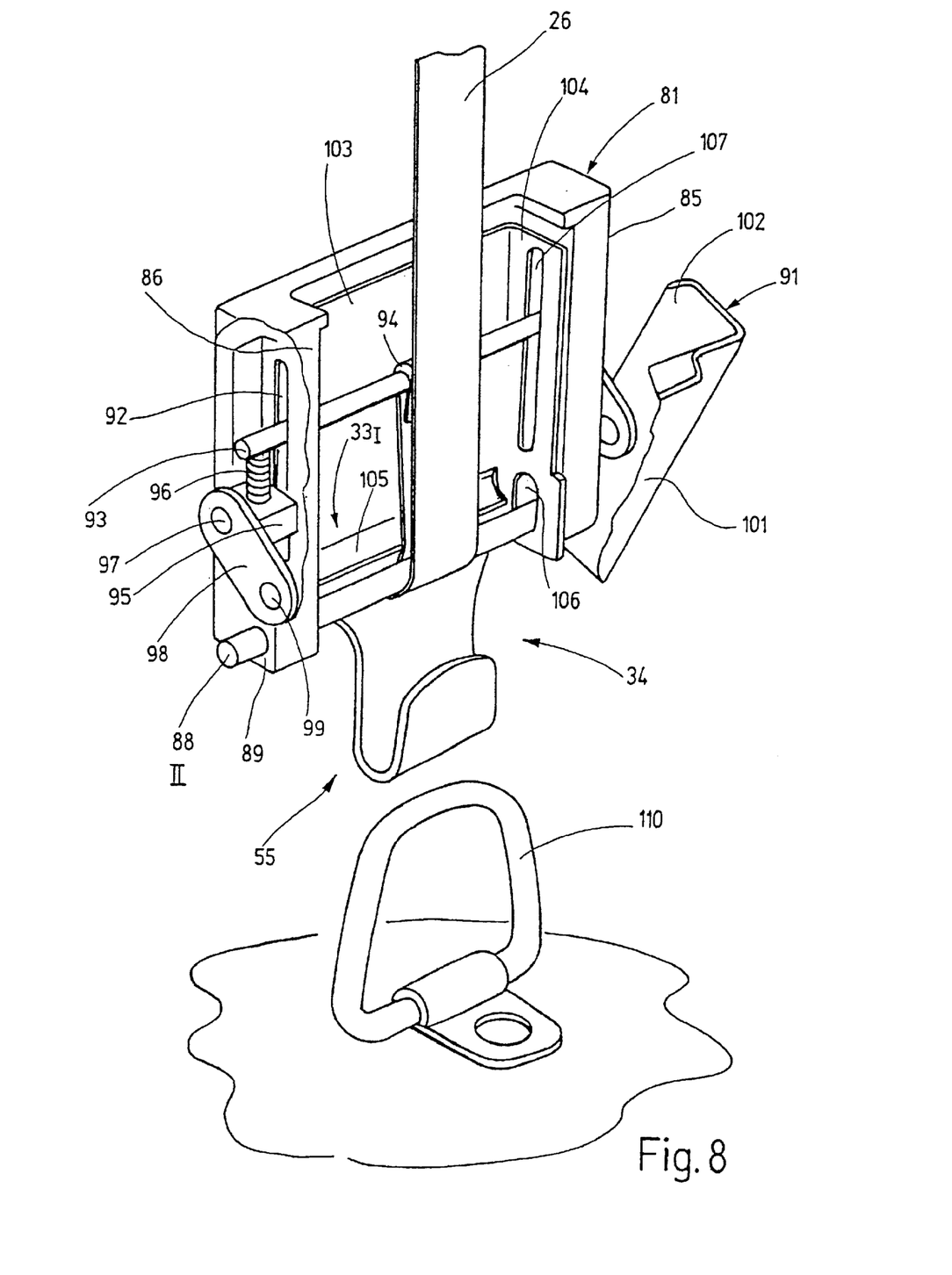
FIG. 8 is a partially broken open perspective view of another embodiment of the anchoring arrangement.

FIG. 8 shows an embodiment which with a short spring stroke is capable of balancing the car body tolerances. Insofar as in the embodiment according to FIGS. 8 to 10 there are used already-described structural components, the same reference numbers are used. The non-extensible belt strap 26 is merely shown reduced in width, in order to make it possible to recognize the construction in the representation of FIG. 8.

Figure 9:
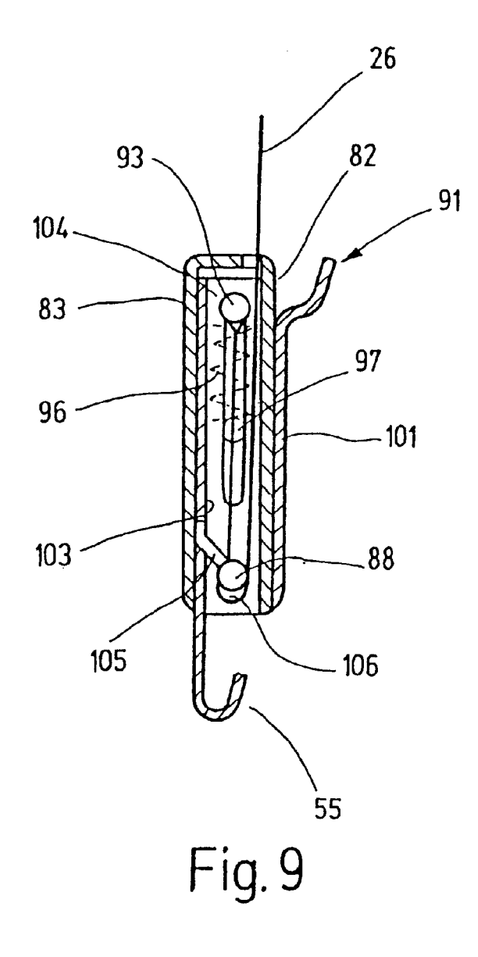
FIGS. 9 and 10 are longitudinal section views of the anchoring arrangement of FIG. 8 in two different functional positions.
Figure 10:
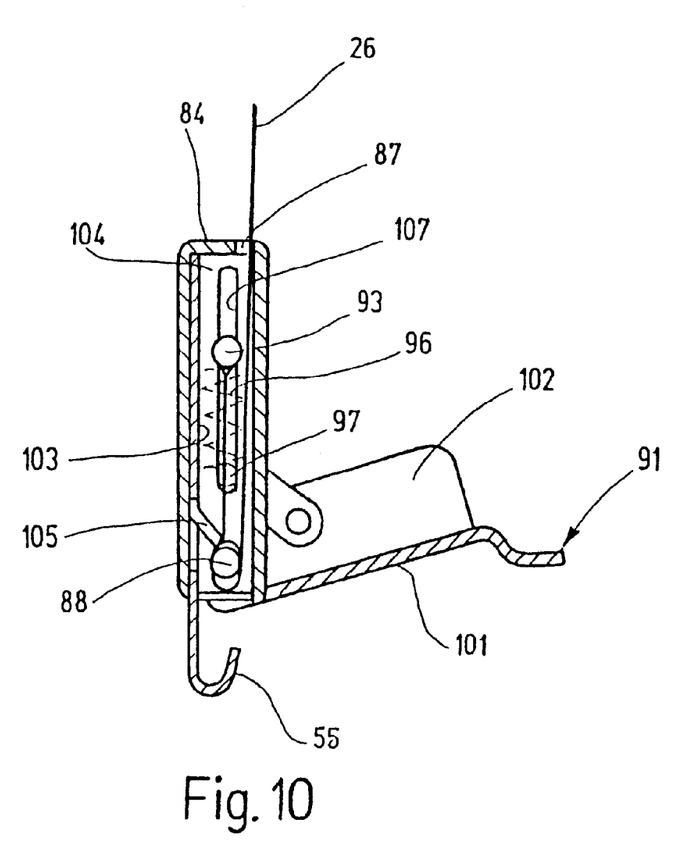

The anchoring elements according to FIGS. 8 to 10 has a bucket-type plastic housing 81 with two flat sides 82 and 83, an upward-facing base 84 as well as two narrow sides 85 and 86.

The housing 81 is open downward.

For the entry of the non-extensible belt band 26, the housing 81 has a corresponding rectangular opening 87 in its base 84.

In the vicinity of the lower end there is a cylindrical rod 88 which is inserted in two bores 89 aligned with one another in the two narrow sides 85 and 86. This cylindrical rod 88 serves, on the one hand, as a deflecting point for the non-extensible belt strap 26, and accordingly as second clamping element 58, and furthermore its ends that project outward over the two narrow sides 85 and 86 are bearing journals for a tension lever 91.

Above the rod 88 the narrow sides 85 and 86 contain two oblong holes 92 aligned with one another, through which there leads an abutment rod 93. To the abutment rod 93 there is attached a loop 94 which represents the lower end of the non-extensible belt band 26.

Beside the narrow side 86 and on its outer side there is longitudinally slidably guided an abutment slider 95. A corresponding second abutment slider 95 is located beside the outer side (not shown) of the narrow side 85. For reasons of clarity there are also not represented the guide paths for the guiding of the abutment slider 95. Between the abutment slider 95 and the outward overhanging ends of the abutment rod 93 there are inserted two pressure springs 96, which tend to shift the abutment rod 93 upward in the direction toward the base 84.

The movement of the abutment slider 95 takes place with the aid of a lever 98 articulated on the abutment slider 95 at 97, the other end of which lever is articulated with a bearing bore 99 on the tension lever 91. The tension lever 91 is a U-shaped part with a back 101 and two lateral flanges 102 proceeding from the back, of which, because of the broken-away representation in FIG. 8 only one is to be perceived.

The tension lever 91 contains in its two lateral flanges 102 two bores aligned with one another, through which there lead the laterally overhanging pivot ends of the deflection rod 88.

At a distance therefrom in the two lateral flanges 102 there are provided two further bores aligned with one another for bearing pins that are inserted into the bores 99 of the levers 98. In this manner, the levers together with the corresponding section of the lateral flange 102 of the tension lever 91, toggle levers which are capable of pushing the buttress slider 95 upward against the action of the pressure springs 96.

The suspension arrangement 34 consists again of a plate cutout, in which the lower part is formed as in the preceding embodiments. The upper section is bent in a U-shape and it consists of a back 103 on which there are molded two lateral flanges 104. Because of the perspective representation, only one of the two flanges 104 is to be seen in the figure. The spacing of the two flanges 104 from one another corresponds to the clear distance between the parallel sides of the two narrow sides 85 and 86. In this manner the U-shaped region of the suspension arrangement 34 is longitudinally slidable in the housing 81 and, namely, at a right angle to the rod 88.

From the back part 103 near the lower end there is released a strip 105 which projects obliquely in the direction toward the deflection rod 88.

For the passage of the deflection rod 88 as well as of the abutment rod 93, the two lateral flanges 104 have two corresponding oblong holes 106 and 107 aligned with one another. The oblong hole 106 has an extent in a direction parallel to the vertical axis of the housing 81, which makes it possible for the strip 105 to approach the rod 88 in the manner described later.

The oblong holes 107 are attuned in their dimensions to the oblong holes 92 so that in every possible operating position of the suspension arrangement 34 the movement stroke of the abutment rod 93 is unhampered.

The rod 88 as well as the strip 105 simultaneously form the two clamping elements 57 and 58 of the clamping arrangement 33.

The functioning is as follows:

After the retaining net 13 is installed, with the upper anchoring element 19 into the T-grooves 22 and the lower anchoring elements 24 hanging loose, then on both anchoring elements 24 the tension levers 91 are hinged downward out of the position shown in FIG. 9 and into the position shown in FIG. 10. By the swinging downward of the tension lever 91, the abutment slider 95 is moved into its lower end position. Depending on the length of the pressure springs 96, the abutment rod 93 follows downward or it remains slightly pressed on the upper end of the oblong holes 92. The user now grasps the housing 81 by hand and guides it downward. In this downward movement, the length of the section of the non-extensible tension strap 26 between the lower edge 16 and the rod 88 must be lengthened, for which reason the belt is drawn out of the section between the rod 88 and the abutment rod 93. The non-extensible belt strap 26 freely slides through between the strip 105 and the rod 88, because the relatively light hook 55 generates no sufficient clamping force.

As soon as the housing 81 has been moved far enough downward so that the hook 55 can be suspended in the eye 110 present under it, the user releases the housing 81 or moves it upward, whereby the hook 55 engages the eye 110 and with the aid of the pressure springs 86, the non-extensible tension strap 26 is tightened. The user then swings the tension lever 91 upward until its back part 101 bears on the corresponding flat side 82 of the housing 81. By this upward movement, the two levers 98 also are moved upward and swung. This leads to an upward movement of the abutment slider 95 and therewith to a shortening of the distance between the abutment slider 95 and the abutment rod 93. There the pre-stressing force with which the rod 93 is pushed away from the rod 88 becomes correspondingly greater. Simultaneously, there arises hereby a force with which the free edge of the strip 105 is pressed against the belt strap 26 and therewith against the rod 88 which represents the second clamping element 58.

If in this position an object is flung against the retaining net 13 there arises in the non-extensible belt strap 26 a pull force that tends to draw the non-extensible belt strap 26 around the rod 88. Simultaneously, however, there arises a force which tends to raise the rod 88. Since the position of the strip 105 is fixed by reason of the hooked-in hook 55 and since the rod is supported against it with intervention of the belt strap 26, this leads to the result that with increase force the non-extensible strap 26 is clamped between the strip 105 as first clamping element 57 and the rod 88 as second clamping element 58. This encircling, as a consequence, further entails an adhesive friction which increases the holding force for the non-extensible belt strap 26. The latter cannot slip through and it blocks any further movement of the retaining net 13 into the passenger space.

For the unhooking the tensioning lever 91 is swung downward and the housing 81 is bowed downward by hand. At the moment in which the user grasps the housing 81 and moves it downward, the hooking force vanishes and therewith also the force with which the strip 105 is pressed against the belt strap 26 and the rod 88. Since now no clamping effect occurs, the non-extensible belt strap 26 can slide virtually freely about the rod 88 in order to make possible an unhooking of the hook 55 from the eye 110.

The advantage of the solution according to FIGS. 8 to 10 lies in that the spring stroke can be less than the sum of maximum car body tolerance plus the stroke that is required to hang the hook 55 into the eye 110. The spring stroke is supplemented by the stroke which the two abutment sliders 95 run through in the swinging of the tensioning lever 91.

Conversely, the arrangement can also be dimensioned in such manner that the hooks can be hung-in with relatively little actuating force, and the pre-stressing force in the retaining net 13 is clearly increased by the swinging-up of the tensioning lever 91. A higher tension in the retaining net 13 results in smaller oscillations of the same in use.

In a retaining net arrangement the lower edge of the retaining net is established with two anchoring elements in the vehicle. To the anchoring elements there belong two non-extensible traction mechanisms which in the hung-in state are held by pre-tensioning mechanisms under a corresponding pre-stressing. An automatically acting clamping arrangement introduced both the pre-stressing forces for the tensioning of the retaining net into the car-body, and also the increased forces which arise when an object is flung against the retaining net.

What is claimed is:

1. A retaining net arrangement for separating a cargo space from a passenger space in a motor vehicle comprising,
   a retaining net having substantially parallel first and second edges,
   an anchoring element allocated to the first edge of the retaining net, the anchoring element being arranged to releasably anchor the first edge of the retaining net in the vehicle, at least one flexible and non-extensible tension element having first and second ends and a looped portion spaced from the second edge of the retaining net, the first end of the tension element being connected to the second edge of the retaining net, a pre-stressing element which engages the second end of the non-extensible tension element and acts in a direction to reduce the spacing between the loop portion of the tension element and the second edge of the retaining net, a clamping arrangement through which the tension element extends, the clamping arrangement exerting a clamping force on the tension element at least when a force is exerted on the retaining net, and a suspension arrangement connected to the clamping arrangement for joining the clamping arrangement to the vehicle.

2. A retaining net arrangement according to claim 1, wherein the non-extensible tension element comprises a strap.

3. A retaining net arrangement according to claim 1, wherein the pre-stressing element includes at least one elastic member having a first end connected to the second end of the tension element.

4. A retaining net arrangement according to claim 3, wherein the elastic member has a second end connected to the second edge of the retaining net.

5. A retaining net arrangement according to claim 3, wherein the elastic member has a second end connected to the clamping arrangement.

6. A retaining net arrangement according to claim 3, wherein the elastic member comprises an extensible member.

7. A retaining net arrangement according to claim 3, wherein the elastic member comprises a pressure member.

8. A retaining net arrangement according to claim 1, wherein the clamping arrangement is configured such that the clamping force is increased when a tensile force between the retaining net and the suspension arrangement is increased.

9. A retaining net arrangement according to claim 1, wherein clamping elements are allocated to the clamping arrangement in such manner that the clamping force is increased when a tensile force between the retaining net and the suspension arrangement is increased.

10. A retaining net arrangement according to claim 1, wherein the clamping arrangement includes first and second clamping elements between which the tension element extends, and wherein the first clamping element is connected with the suspension arrangement.

11. A retaining net arrangement according to claim 10, wherein the second clamping element serves as deflecting member for the non-extensible tension element and defines the loop portion.

12. A retaining net arrangement according to claim 10, wherein the pre-stressing element is operative between the second end of the tension element and the second clamping element.

13. A retaining net arrangement according to claim 1, wherein the pre-stressing element includes an abutment element with the distance from the second clamping element to the abutment element being variable.

14. A retaining net arrangement according to claim 10, wherein the clamping arrangement includes a housing into which the tension element extends, in which the second clamping element is arranged and in which the suspension arrangement is slidably supported in a direction parallel to a longitudinal axis of the tension element.

15. A retaining net arrangement according to claim 14, wherein the second clamping element comprises a rod which is ridgidly arranged in the housing.

16. A retaining net arrangement according to claim 14, wherein the second clamping element comprises a rod that is movably supported in the housing, transverse to a longitudinal axis of the suspension arrangement.

17. A retaining net arrangement according to claim 16, wherein the rod carries a radially running arm on each end thereof, each radially running arm carrying on a free end thereof a projection that extends parallel to the rod, and the two projections lying in a common plane.

18. A retaining net arrangement according to claim 10, wherein the first clamping element includes an edge formed on the suspension arrangement.

19. A retaining net arrangement according to claim 18, wherein the edge is a section of a periphery of an opening.

20. A retaining net arrangement according to claim 18, wherein the edge is formed on a strip.

* * * * *